US012609574B2

(12) United States Patent
Nagamoto et al.

(10) Patent No.: US 12,609,574 B2
(45) Date of Patent: Apr. 21, 2026

(54) MOTOR AND FAN DEVICE

(71) Applicant: MITSUBA Corporation, Gunma (JP)

(72) Inventors: Satoshi Nagamoto, Gunma (JP);
Keiichi Hosoi, Gunma (JP); **Minoru
Ota, Gunma (JP); Hiroshi Uehara**,
Gunma (JP); Tomohiko Mita, Gunma
(JP)

(73) Assignee: MITSUBA Corporation, Gunma (JP)

( * ) Notice: Subject to any disclaimer, the term of this
patent is extended or adjusted under 35
U.S.C. 154(b) by 203 days.

(21) Appl. No.: 18/498,007

(22) Filed: Oct. 30, 2023

(65) Prior Publication Data

US 2024/0204601 A1 Jun. 20, 2024

(30) Foreign Application Priority Data

Dec. 20, 2022 (JP) ................................. 2022-203539
Sep. 25, 2023 (JP) ................................. 2023-161629

(51) Int. Cl.
*H02K 3/50* (2006.01)
*H02K 3/52* (2006.01)
*H02K 5/22* (2006.01)
*H02K 11/00* (2016.01)
*H02K 7/14* (2006.01)

(52) U.S. Cl.
CPC ................. *H02K 3/50* (2013.01); *H02K 3/52*
(2013.01); *H02K 5/225* (2013.01); *H02K*
*11/0094* (2013.01); *H02K 3/522* (2013.01);
*H02K 7/14* (2013.01); *H02K 2203/03*
(2013.01)

(58) Field of Classification Search
CPC .... H02K 5/225; H02K 11/0094; H02K 3/522;
H02K 3/50; H02K 3/52; H02K 7/14;
H02K 2203/03

USPC ........................................................... 310/71
See application file for complete search history.

(56) References Cited

U.S. PATENT DOCUMENTS

| | | | | |
|---|---|---|---|---|
| 2016/0099623 | A1* | 4/2016 | Böhm | H02K 3/522 |
| | | | | 310/43 |
| 2017/0331342 | A1* | 11/2017 | Beetz | H01R 4/2429 |

FOREIGN PATENT DOCUMENTS

| | | | |
|---|---|---|---|
| JP | 2022076524 | 5/2022 | |
| WO | WO-2022102440 A1 * | 5/2022 | H02K 15/33 |

OTHER PUBLICATIONS

Nagamoto et al, Brushless Motor and Brushless Motor Manufacturing Method, May 19, 2022, WO 2022102440 (English Machine Translation) (Year: 2022).*

* cited by examiner

*Primary Examiner* — Alexander A Singh
(74) *Attorney, Agent, or Firm* — JCIPRNET

(57) ABSTRACT

The motor includes a circuit board that controls the generation of a magnetic field for rotating a rotor by supplying currents to coils, and a slit terminal (60U) that electrically connects a winding wire to the circuit board. The slit terminal (60U) includes a pair of legs (63A, 63B) arranged to face each other across the winding wire (244U) at an interval that is narrower than a diameter of a core wire. A motor bracket includes a terminal holder (43U) that has peeled piece accommodation spaces (52A, 52B) for accommodating the peeled pieces (245U) peeled off from the winding wire (244U) press-fitted between the pair of legs (63A, 63B).

8 Claims, 13 Drawing Sheets

MOTOR AND FAN DEVICE

CROSS-REFERENCE TO RELATED APPLICATION

This application claims the priority benefits of Japanese application no. 2022-203539, filed on Dec. 20, 2022, and Japanese application no. 2023-161629, filed on Sep. 25, 2023. The entirety of the above-mentioned patent application is hereby incorporated by reference herein and made a part of this specification.

BACKGROUND

Technical Field

The disclosure relates to a motor and a fan device equipped with the motor.

Description of Related Art

In recent years, efforts have been made to promote the Sustainable Development Goals (2030 agenda for sustainable development, adopted in the UN Summit on Sep. 25, 2015, hereinafter referred to as "SDGs"). Accordingly, there are techniques that aim to reduce waste and defective products in order to secure sustainable production and consumption patterns.

Conventionally, a so-called "mechanically and electrically integrated" motor is known, which includes a brushless motor and a circuit board that controls the power supplied to the brushless motor (see, for example, Patent Document 1 (Japanese Patent Application Laid-Open No. 2022-76524)). For such a motor, it is necessary to electrically connect the ends of the winding wire wound around the stator in a coil shape to the circuit board.

Thus, Patent Document 1 discloses a power supply structure that simultaneously removes the coating of the winding wire and electrically connects the winding wire by press-fitting the winding wire between a pair of legs of a slit terminal that is electrically connected to the circuit board.

Here, the peeled pieces that are peeled off from the winding wire press-fitted between the pair of legs include not only the insulating coating but also the conductive core wire. For this reason, a short circuit may occur in the power supply structure of Patent Document 1 if the peeled pieces come into contact with the circuit board.

The disclosure provides a technique for preventing the circuit board from having a short circuit due to the peeled pieces peeled off from the winding wire, in a motor in which the winding wire is electrically connected to the circuit board using a slit terminal.

SUMMARY

The disclosure provides a motor, including: a motor bracket; a shaft supported by the motor bracket; a rotor rotatably supported by the shaft; a stator fixed to the motor bracket and including a plurality of teeth arranged at positions spaced apart in a circumferential direction and a plurality of coils formed by winding a winding wire around each of the plurality of teeth, in which the winding wire has a conductive core wire covered with an insulating coating; a circuit board fixed to the motor bracket and controlling generation of a magnetic field for rotating the rotor by supplying currents to the coils; and a slit terminal electrically connecting the winding wire to the circuit board. The slit terminal includes a pair of legs arranged to face each other across the winding wire at an interval that is narrower than a diameter of the core wire, and the motor bracket includes a terminal holder having peeled piece accommodation spaces for accommodating peeled pieces peeled off from the winding wire press-fitted between the pair of legs.

The disclosure is capable of preventing the circuit board from having a short circuit due to the peeled pieces peeled off from the winding wire, in the motor in which the winding wire is electrically connected to the circuit board using the slit terminal. Problems, configurations, and effects other than those described above will be clarified by the following description of the embodiments.

DESCRIPTION OF THE EMBODIMENTS

First Embodiment

As one aspect of the fan device according to the embodiment of the disclosure, a fan device that is mounted in a vehicle such as an automobile and cools engine cooling water or the like that flows through a radiator will be described below.

(Overall Configuration of the Fan Device 1)

Figure 1:
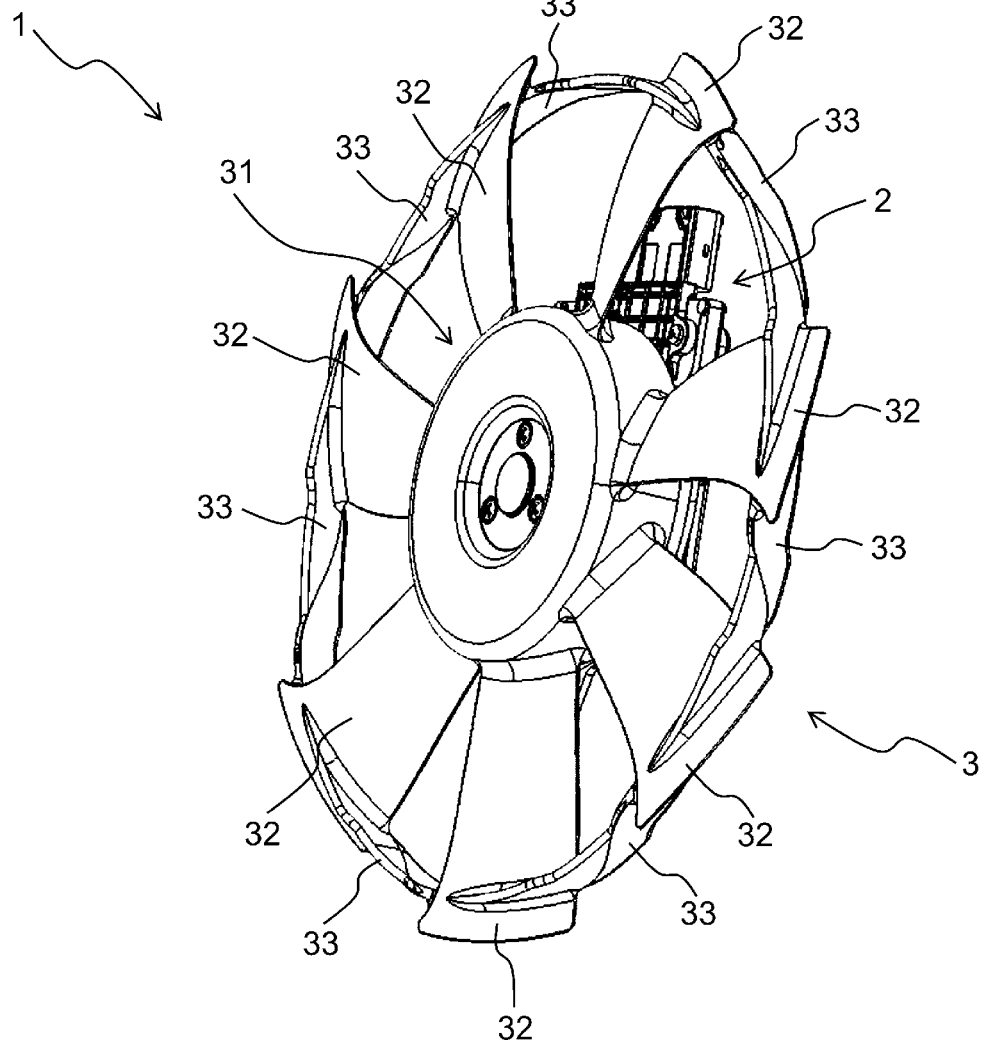
FIG. 1 is an external perspective view showing one configuration example of the fan device according to an embodiment.
Figure 2:
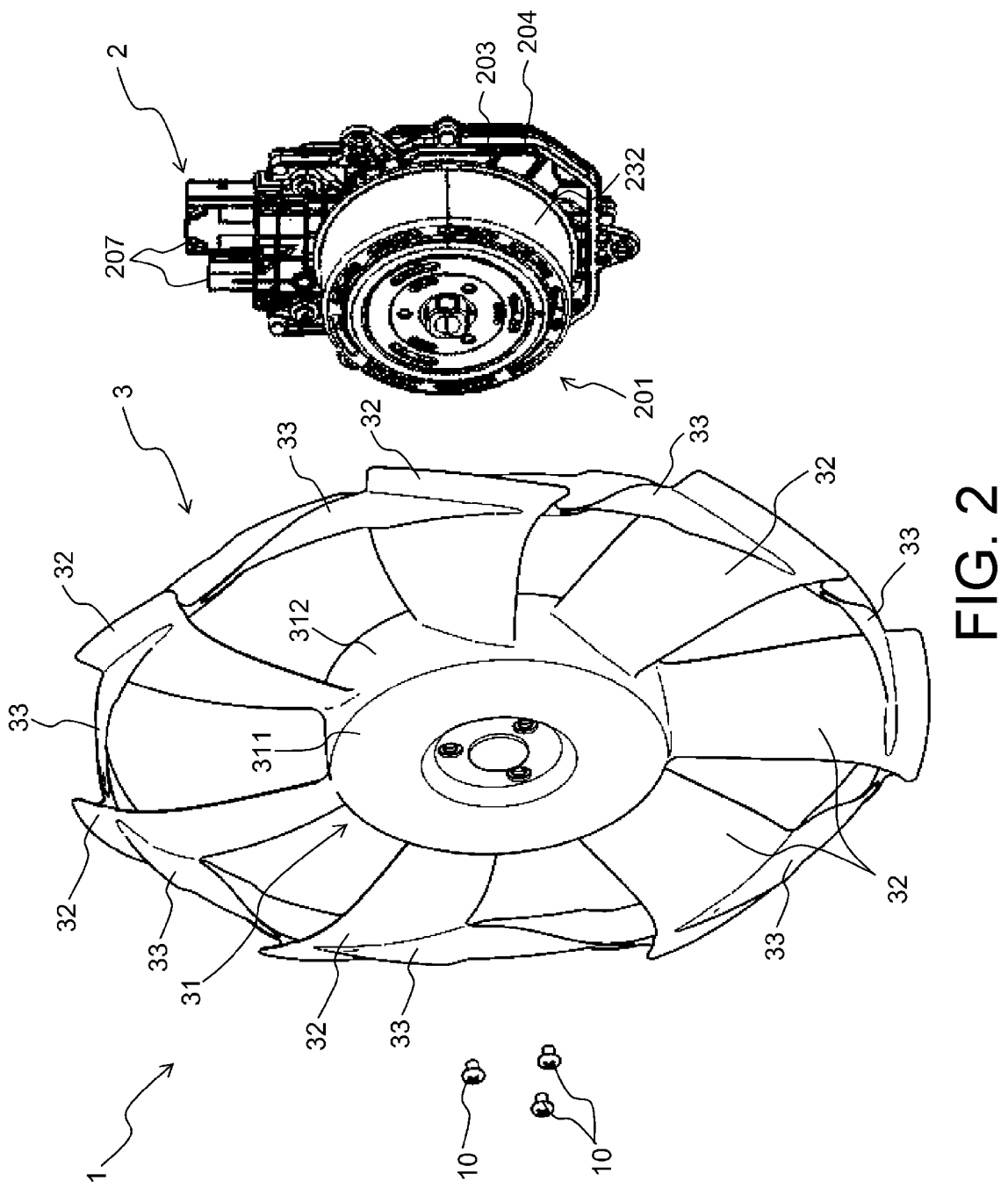
FIG. 2 is an exploded perspective view when the motor and the fan are disassembled.

First, the overall configuration of the fan device 1 will be described with reference to FIG. 1 and FIG. 2. FIG. 1 is an external perspective view showing one configuration example of the fan device 1 according to an embodiment. FIG. 2 is an exploded perspective view when a motor 2 and a fan 3 are disassembled.

As shown in FIG. 1 and FIG. 2, the fan device 1 includes the motor 2 which is a drive source, and the fan 3 which is rotationally driven by the motor 2 to generate cooling air. The fan device 1 is arranged, for example, in an engine room to face a radiator.

(Configuration of the Motor 2)

Figure 3:
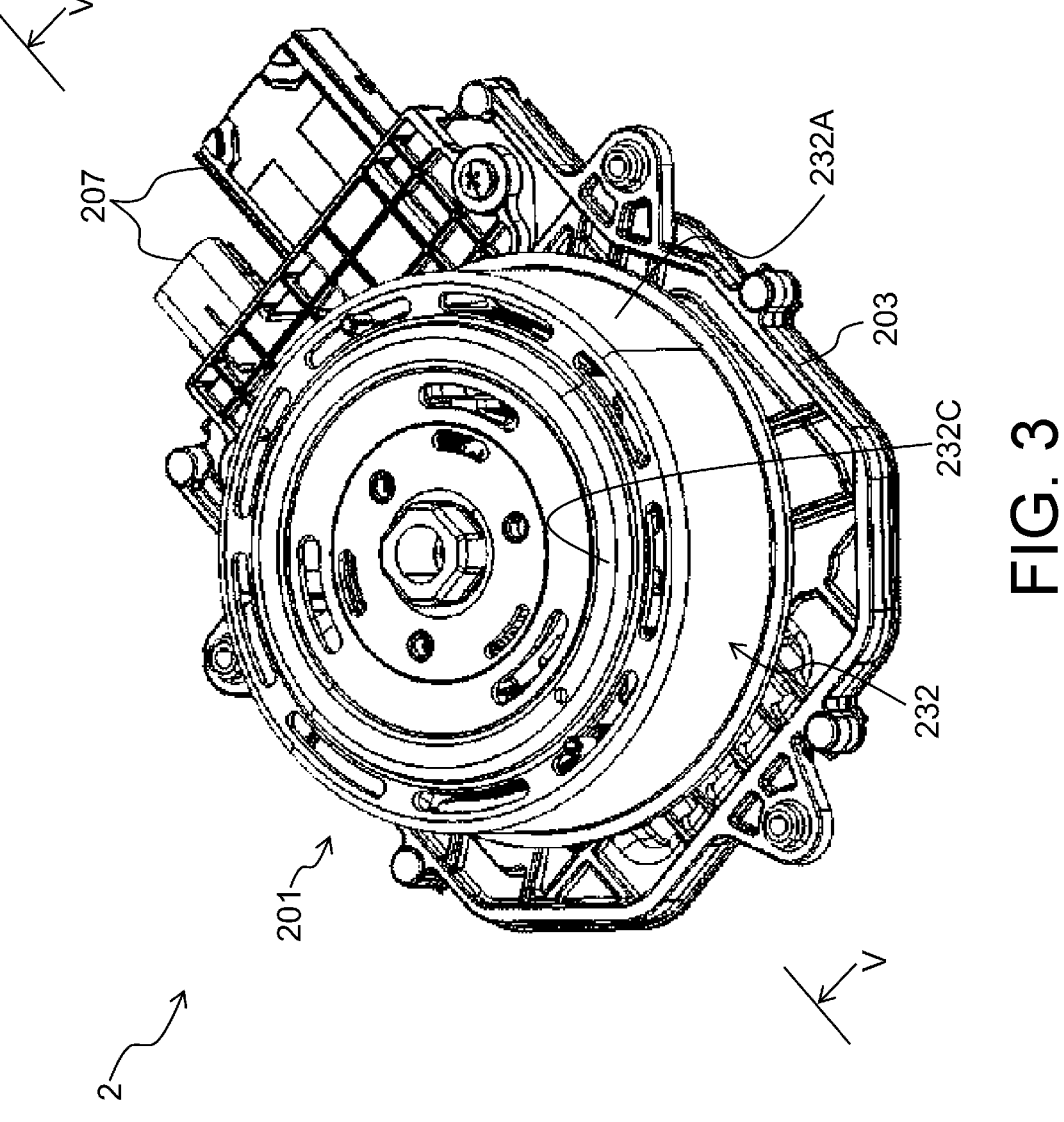
FIG. 3 is an external perspective view of the motor viewed from the front surface side.
Figure 4:
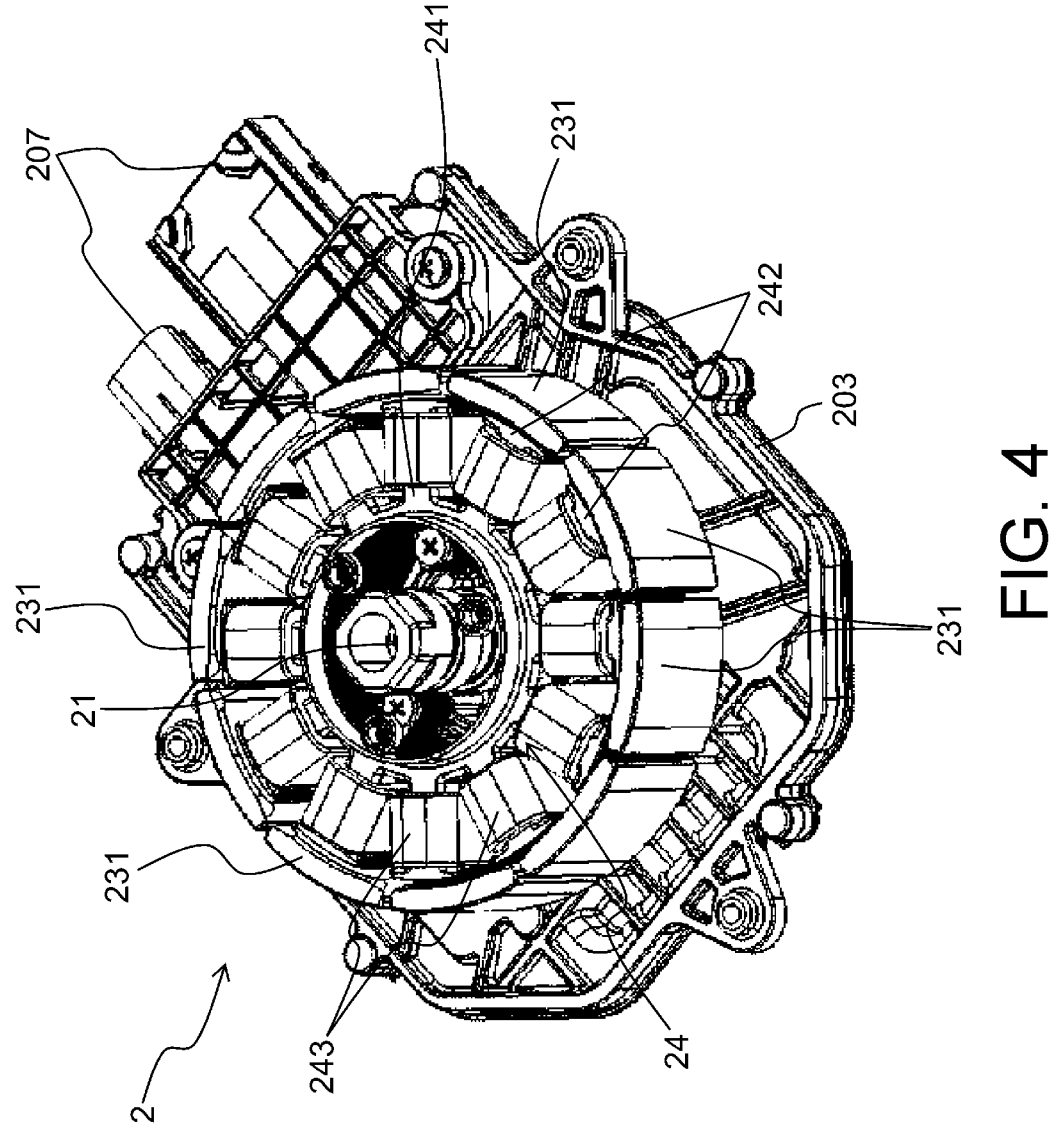
FIG. 4 is a perspective view showing the configuration of the motor with the rotor yoke removed.
Figure 5:
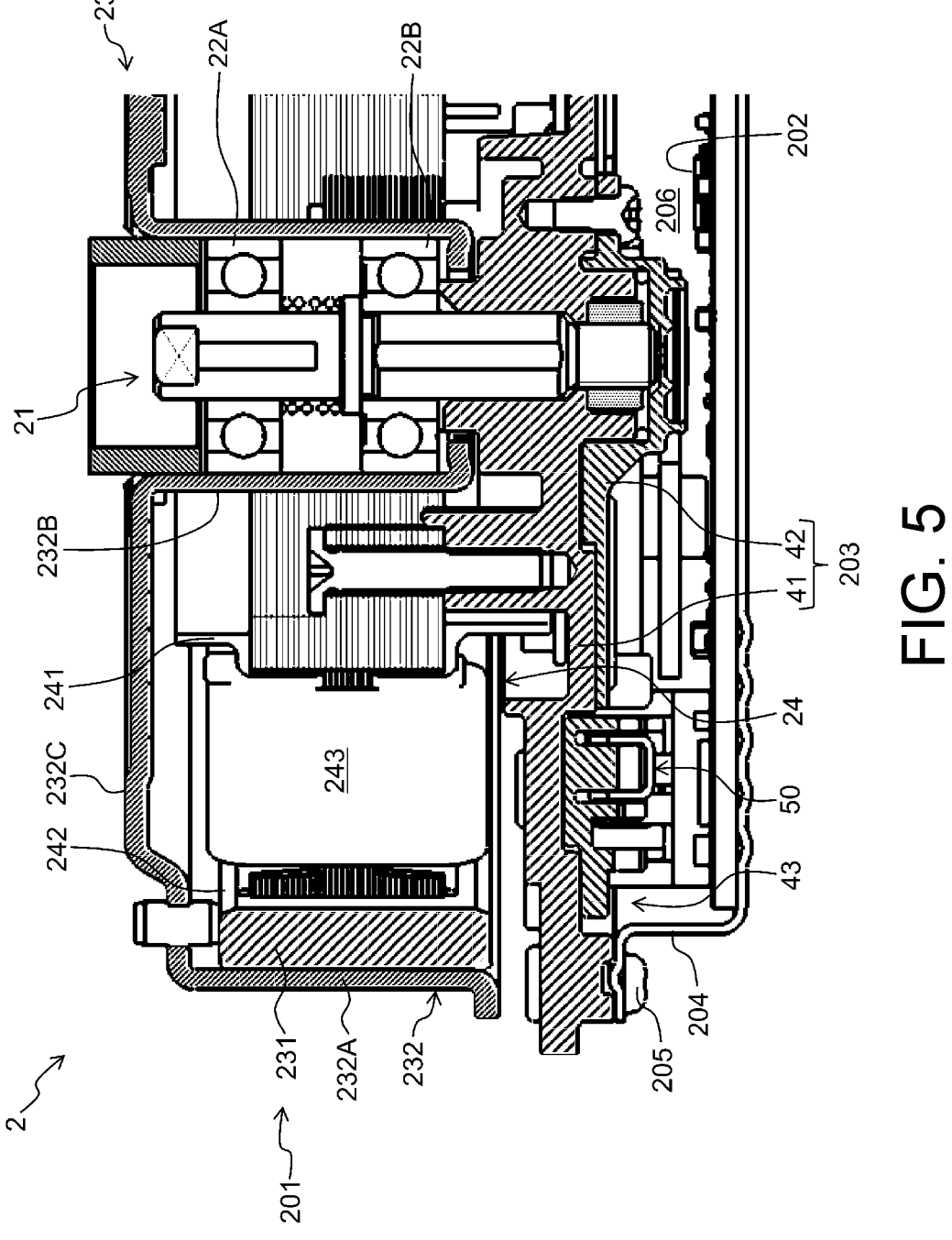
FIG. 5 is a cross-sectional view taken along the line V-V in FIG. 3.

Next, the configuration of the motor 2 will be described with reference to FIG. 3 to FIG. 5. FIG. 3 is an external perspective view of the motor 2 viewed from the front surface side. FIG. 4 is a perspective view showing the configuration of the motor 2 with a rotor yoke 232 removed. FIG. 5 is a cross-sectional view taken along the line V-V in FIG. 3.

As shown in FIG. 3 to FIG. 5, the motor 2 is a so-called "mechanically and electrically integrated" electric motor that includes an outer rotor type brushless motor 201 and a circuit board 202 that controls the brushless motor 201 (more specifically, the magnetic field generated by coils 243).

The brushless motor 201 is supported by a plate-shaped motor bracket 203. The brushless motor 201 is arranged on one side (front surface side) of the motor bracket 203 in the thickness direction. Besides, a driver bracket 204 is fastened with a plurality of screws 205 to the other side (back surface side) of the motor bracket 203 in the thickness direction. Thus, an accommodation space 206 is formed between the motor bracket 203 and the driver bracket 204. Then, the circuit board 202 is accommodated in this accommodation space 206.

Further, a connector unit 207 is attached to an end of the motor bracket 203. The connector unit 207 is formed by integrating two connectors, to which external harnesses are connected. The brushless motor 201, the circuit board 202, and the connector unit 207 are electrically connected to one another via the motor bracket 203.

The brushless motor 201 includes a shaft 21, bearings 22A and 22B provided on the outer periphery of the shaft 21, a rotor 23 rotatably supported around the axis of the shaft 21 via the bearings 22A and 22B, and an annular stator 24 fixed inside the rotor 23.

The shaft 21 is a fixed shaft with one axial end fixed to the front surface side of the motor bracket 203. In the following description of the components of the motor 2, the axial direction of the shaft 21 is simply referred to as the "axial direction," the radial direction about the axis of the shaft 21 is simply referred to as the "radial direction," and the circumferential direction about the axis of the shaft 21 is simply referred to as the "circumferential direction."

The rotor 23 includes a plurality of permanent magnets 231 and the rotor yoke 232. The permanent magnets 231 are arranged at equal intervals in the circumferential direction to surround the outer periphery of the stator 24. The rotor yoke 232 covers the stator 24 and the permanent magnets 231. The rotor yoke 232 is arranged on the front surface side of the motor bracket 203 to be concentric with the axis of the shaft 21. In addition, the rotor yoke 232 is rotatably supported by the shaft 21 via the bearings 22A and 22B. Furthermore, the rotor yoke 232 includes an outer peripheral wall 232A, an inner peripheral wall 232B, and a connecting wall 232C.

The outer peripheral wall 232A has a cylindrical outer shape. In addition, the outer peripheral wall 232A is arranged outside the stator 24 in the radial direction, and the outer peripheral wall 232A supports the permanent magnets 231 on the inner peripheral surface. In other words, the permanent magnets 231 are fixed to the inner peripheral surface of the outer peripheral wall 232A at predetermined intervals in the circumferential direction.

The inner peripheral wall 232B has a cylindrical outer shape. In addition, the inner peripheral wall 232B is arranged inside the stator 24 in the radial direction, and the inner peripheral wall 232B is rotatably supported by the shaft 21 via the bearings 22A and 22B.

The connecting wall 232C has a disk-shaped outer shape. In addition, the connecting wall 232C connects the axial ends of the outer peripheral wall 232A and the inner peripheral wall 232B. More specifically, as shown in FIG. 5, the connecting wall 232C connects the outer peripheral wall 232A and the inner peripheral wall 232B on the other end side of the shaft 21 in the axial direction (that is, the side opposite to the motor bracket 203).

The stator 24 is accommodated in a space surrounded by the outer peripheral wall 232A, the inner peripheral wall 232B, the connecting wall 232C, and the motor bracket 203. The stator 24 is fixed to the front surface side of the motor bracket 203, inside the permanent magnets 231 in the radial direction. Furthermore, the stator 24 faces the permanent magnets 231 with a predetermined gap in the radial direction.

The stator 24 includes a cylindrical stator core 241, a plurality of teeth 242 (twelve in this embodiment) protruding outward in the radial direction from the stator core 241 at positions spaced apart in the circumferential direction, and a plurality of coils 243 respectively wound around the teeth 242 that are covered with an insulating insulator. The coils 243 are configured by repeatedly winding winding wires 244U, 244V, and 244W (see FIG. 6) around the teeth 242. Each of the winding wires 244U, 244V, and 244W has a conductive core wire covered with an insulating coating.

The twelve teeth 242 are divided into three groups, and the coils 243 wound around the teeth 242 of each group are supplied with any one of U-phase, V-phase, and W-phase currents. That is, the circuit board 202 supplies a U-phase current to the four winding wires 244U, a V-phase current to the four winding wires 244V, and a W-phase current to the four winding wires 244W. In this embodiment, the number N of the teeth 242 of each phase (that is, the winding wires 244U, 244V, or 244W) is 4, but the value of N is not limited to the above example.

The stator 24 generates a magnetic field when the U-phase, V-phase, and W-phase currents flow through the coils 243. Then, the rotor yoke 232 is rotated about the axis of the shaft 21 by the attractive force and repulsive force generated between the magnetic field generated by the coils 243 and the permanent magnets 231.

Furthermore, as shown in FIG. 5, the motor bracket 203 includes a bracket 41 and a bracket cover 42. The bracket 41 forms the front surface side of the motor bracket 203, and the bracket cover 42 forms the back surface side of the motor bracket 203. However, the motor bracket 203 is not necessarily formed by combining the bracket 41 and the bracket cover 42, and may be integrally formed.

The ends of the winding wires 244U, 244V, and 244W that form the coils 243 are pinched by terminal holders 43U, 43V, and 43W (see FIG. 6) provided on the bracket cover 42 and slit terminals 60U, 60V, and 60W (see FIG. 6) to be electrically connected to the circuit board 202.

Figure 6:
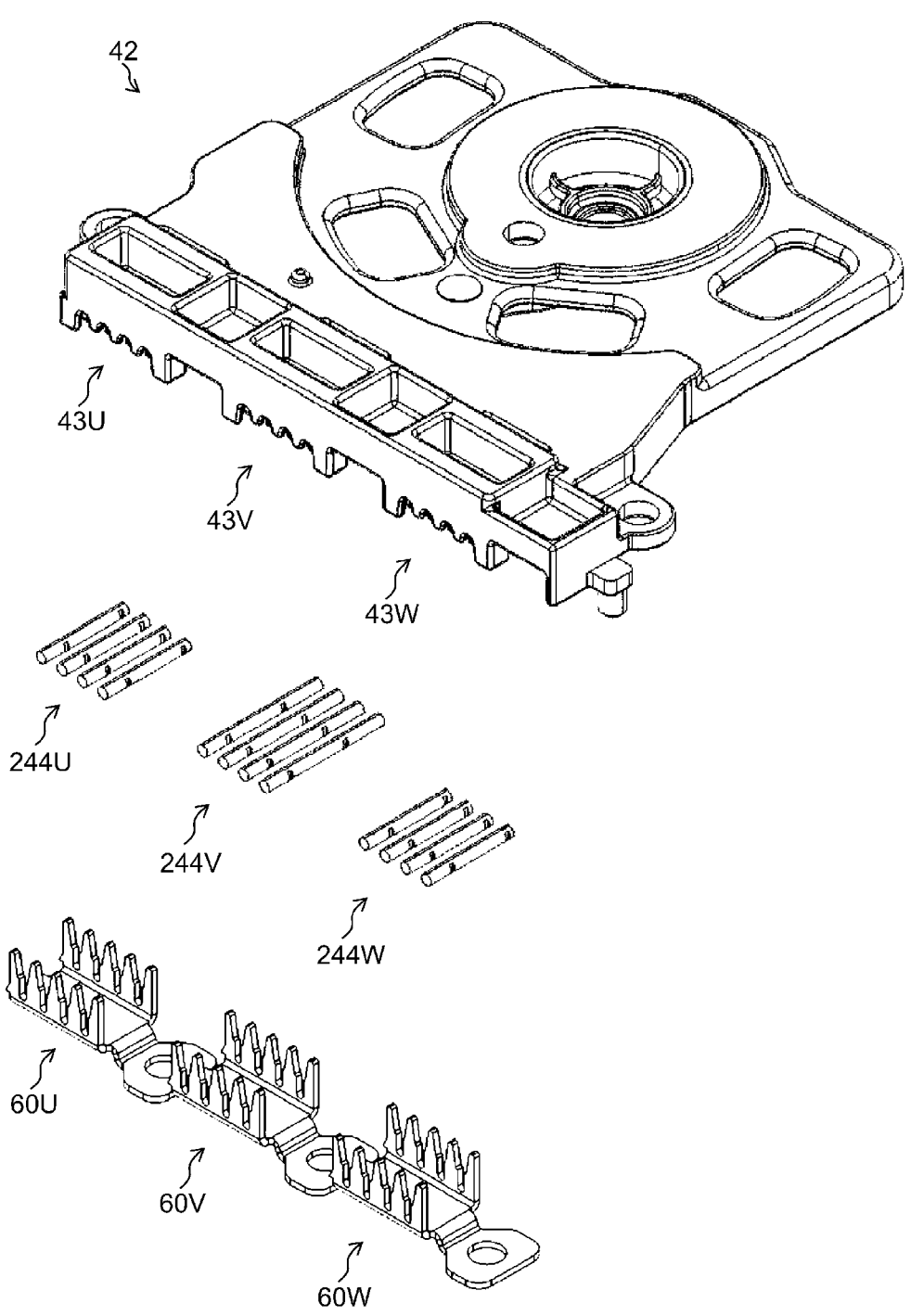
FIG. 6 is an exploded perspective view of the bracket cover, the winding wires, and the slit terminals viewed from the front surface side.
Figure 7:
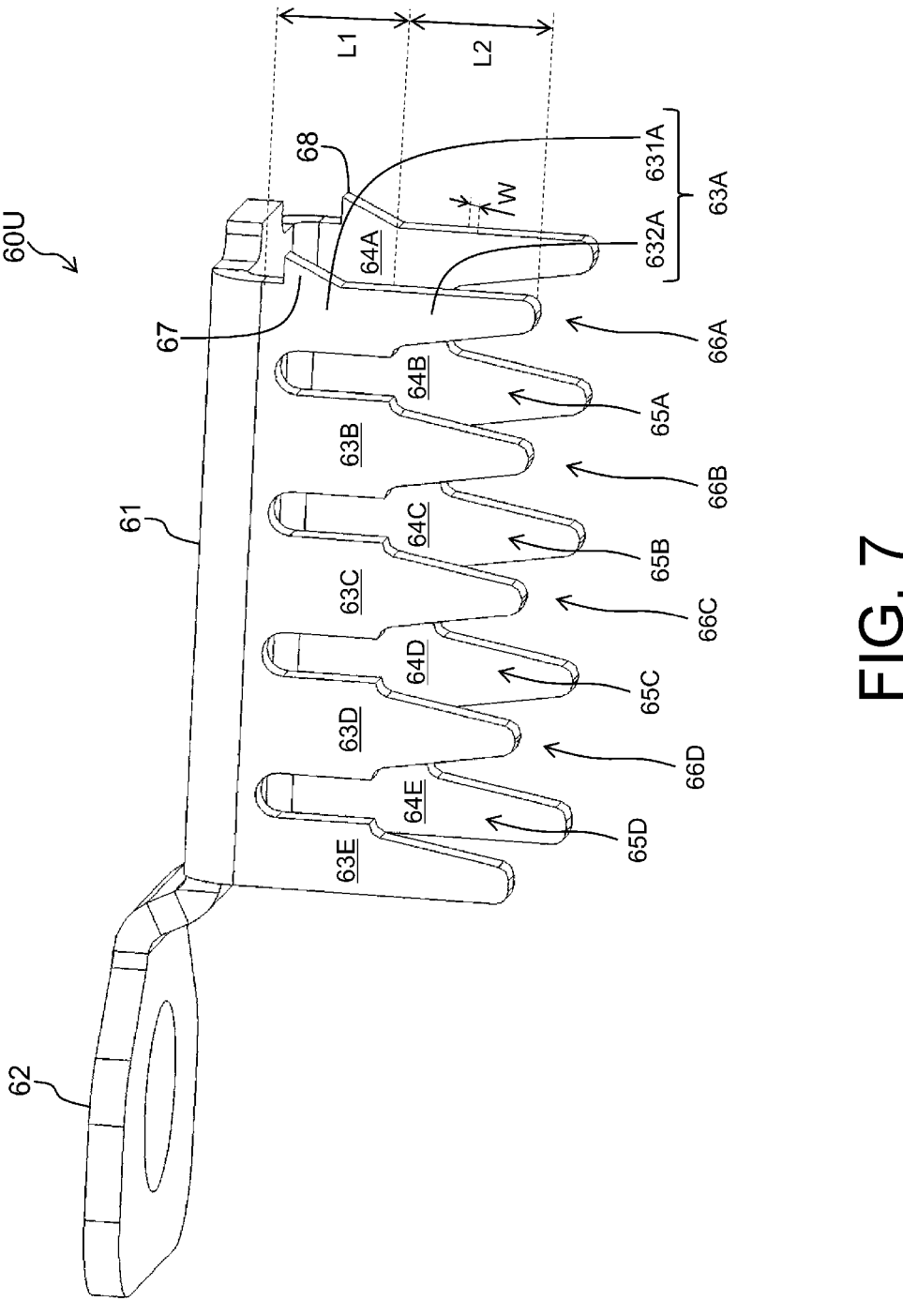
FIG. 7 is a perspective view of the slit terminal.
Figure 8:
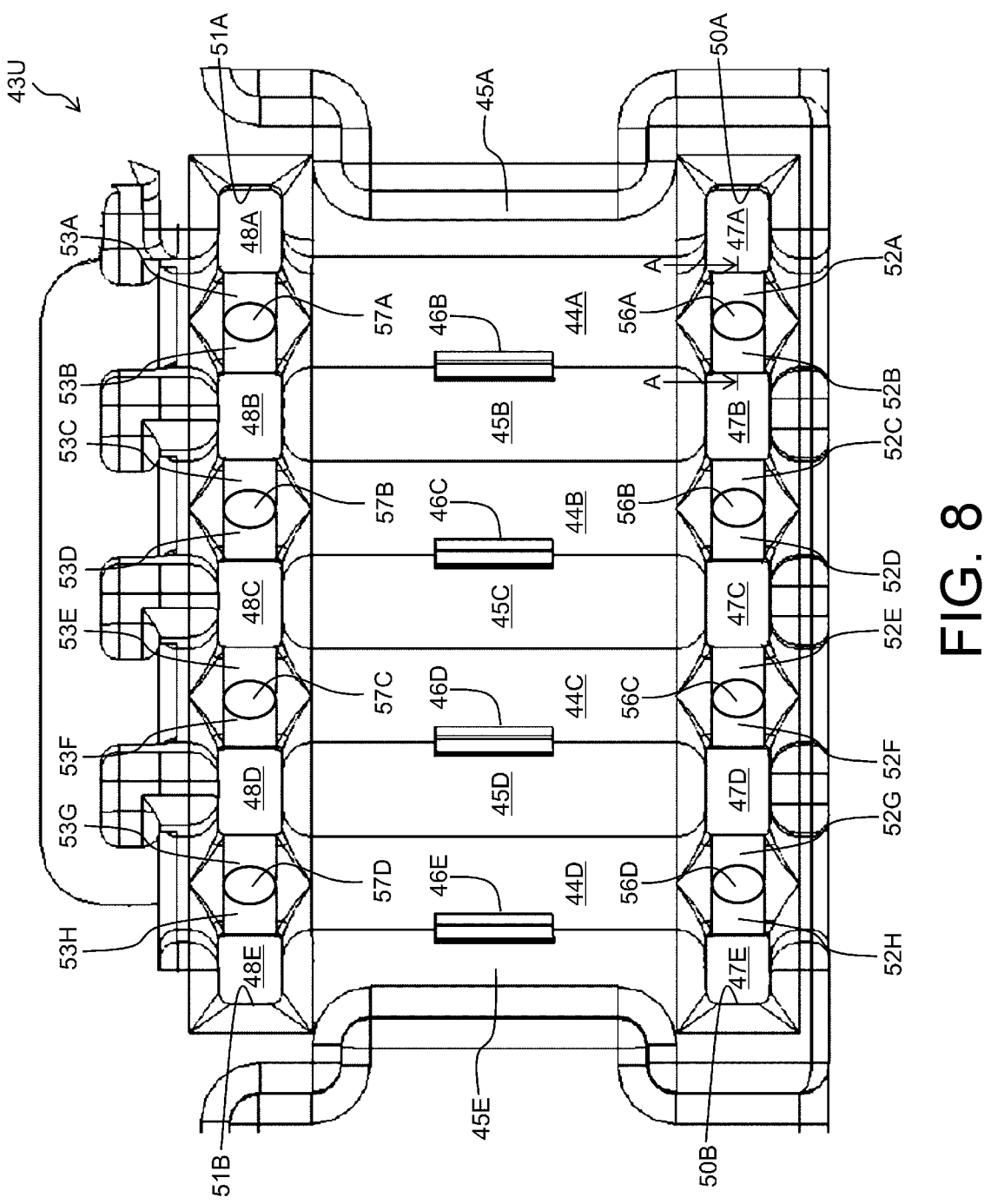
FIG. 8 is a plan view of the terminal holder.
Figure 9A:
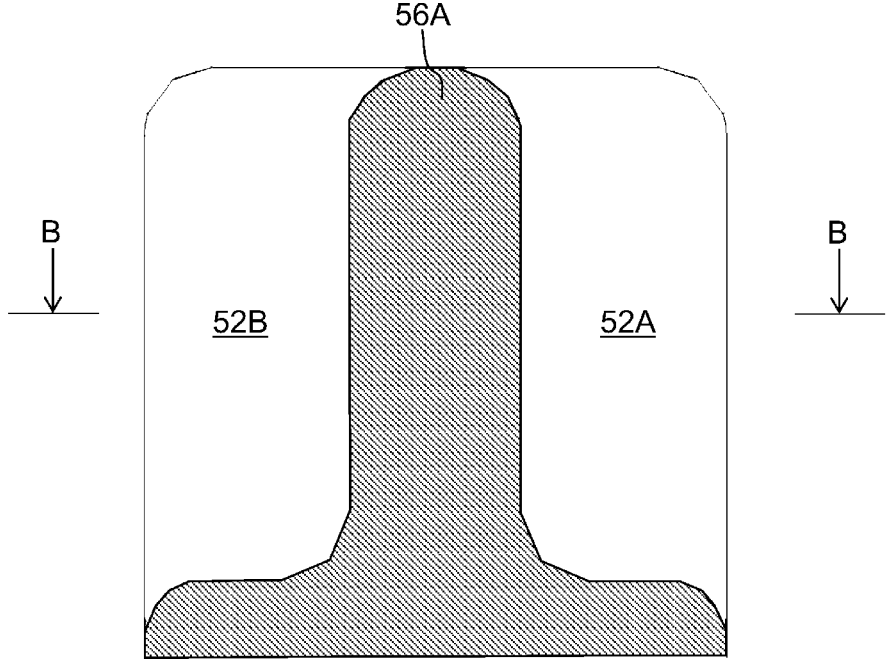
FIG. 9A is a cross-sectional view taken along the line A-A of FIG. 8.

FIG. 6 is an exploded perspective view of the bracket cover 42, the winding wires 244U, 244V, and 244W, and the slit terminals 60U, 60V, and 60W viewed from the front surface side. FIG. 7 is a perspective view of the slit terminal 60U. FIG. 8 is a plan view of the terminal holder 43U. FIG. 9A is a cross-sectional view taken along the line A-A of FIG.

Figure 9B:
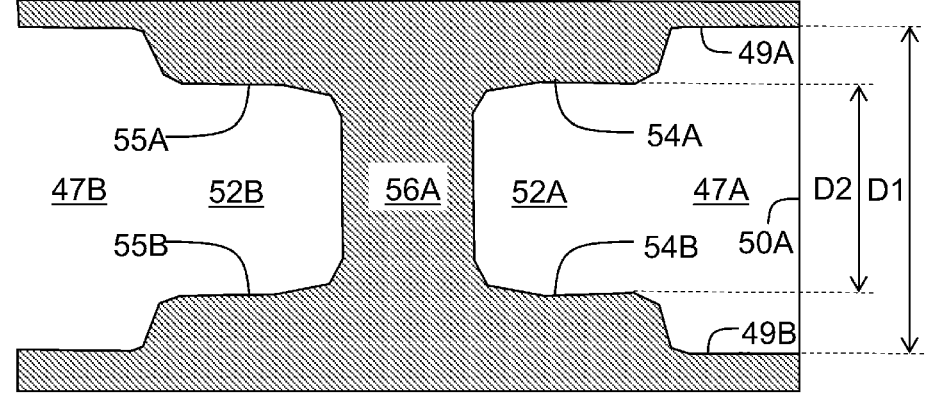
FIG. 9B is a cross-sectional view taken along the line B-B of FIG. 9A.

8. FIG. 9B is a cross-sectional view taken along the line B-B of FIG. 9A. FIG. 10A to FIG. 10D are cross-sectional views showing a process of inserting the winding wire 244U into a slit 65A of the slit terminal 60U.

As shown in FIG. 6, the terminal holders 43U, 43V, and 43W are formed at an end of the bracket cover 42 to hold the winding wires 244U, 244V, and 244W of the respective phases. The terminal holders 43U, 43V, and 43W (more specifically, the bracket cover 42) are integrally molded with an insulating material (for example, resin). The slit terminals 60U, 60V, and 60W are made of a conductive material. Three slit terminals 60U, 60V, and 60W are provided corresponding to the U-phase, V-phase, and W-phase, respectively. Since the terminal holders 43U, 43V, and 43W, the winding wires 244U, 244V, and 244W, and the slit terminals 60U, 60V, and 60W of the respective phases have configurations in common, the terminal holder 43U, the winding wire 244U, and the slit terminal 60U will be described in detail below.

The four winding wires 244U are arranged in parallel at predetermined intervals between the terminal holder 43U and the slit terminal 60U. Hereinafter, the direction in which the winding wire 244U extends between the terminal holder 43U and the slit terminal 60U (the direction of the short side of a base 61 which will be described later) is referred to as the "extending direction of the winding wire 244U," the direction in which the four winding wires 244U are arranged (the direction of the long side of the base 61) is referred to as the "arrangement direction of the winding wire 244U," and the direction in which legs 63A to 64E, which will be described later, protrude (the thickness direction of the base 61) is referred to as the "protruding direction of the legs 63A to 64E." The extending direction of the winding wire 244U, the arrangement direction of the winding wire 244U, and the protruding direction of the legs 63A to 64E are directions perpendicular to each other.

The slit terminal 60U is arranged between the motor bracket 203 (more specifically, the terminal holder 43U) and the circuit board 202 to electrically connect the winding wire 244U to the circuit board 202. As shown in FIG. 7, the slit terminal 60U is composed of the base 61, a contact 62, and a plurality of legs 63A, 63B, 63C, 63D, 63E, 64A, 64B, 64C, 64D, and 64E. The base 61 is a rectangular portion connecting the contact 62 and the legs 63A to 64E. The contact 62 is a portion extending from the short side of the rectangular base 61 in the arrangement direction of the winding wire 244U. The contact 62 is electrically connected to the circuit board 202 by a bolt or the like.

The legs 63A to 63E and the legs 64A to 64E are arranged to face each other at predetermined intervals along the long sides of the rectangular base 61 (that is, the arrangement direction of the winding wire 244U). The five (=N+1) legs 63A to 63E protrude in the thickness direction of the base 61 from one long side of the rectangular base 61. Furthermore, the five legs 64A to 64E protrude in the thickness direction of the rectangular base 61 from the other long side of the base 61. That is, the legs 63A to 63E and the legs 64A to 64E are provided at a plurality of positions (two locations) spaced apart in the direction of the short side of the base 61 (the extending direction of the winding wire 244U). As a result, the slit terminal 60U has a generally U-shaped outer shape.

The leg 63A is composed of a base portion 631A and a guide portion 632A. The base portion 631A is a portion on the base end side of the leg 63A connected to the base 61. The guide portion 632A is a portion on the tip side of the leg 63A provided at the tip of the base portion 631A. The width of the base portion 631A (the length in the arrangement direction of the winding wire 244U) is constant throughout the protruding direction of the leg 63A. On the other hand, the width of the guide portion 632A gradually decreases toward the tip. That is, the guide portion 632A has a tapered shape. Furthermore, in the protruding direction of the leg 63A, the length L2 of the guide portion 632A is set larger than the length L1 of the base portion 631A. The legs 63B, 63C, 63D, 63E, 64A, 64B, 64C, 64D, and 64E have the same configuration.

As a result, the slit 65A for accommodating one of the four winding wires 244U is formed between the adjacent legs 63A and 63B. That is, the adjacent legs 63A and 63B are arranged to face each other in the arrangement direction of the winding wire 244U with the winding wire 244U interposed therebetween. The width of the slit 65A at the position of the base portions 631A and 631B (the interval between the base portions 631A and 631B in the arrangement direction of the winding wire 244U) is constant throughout the protruding direction of the legs 63A and 63B. On the other hand, the width of the slit 65A at the position of the guide portions 632A an 632B (the interval between the guide portions 632A and 632B in the arrangement direction of the winding wire 244U) gradually increases toward the tips of the legs 63A and 63B.

Similarly, the slits 65B, 65C, 65D, 66A, 66B, 66C, and 66D are formed between the adjacent legs 63B and 63C, legs 63C and 63D, legs 63D and 63E, legs 64A and 64B, legs 64B and 64C, legs 64C and 64D, and legs 64D and 64E to accommodate one winding wire 244U, respectively. The slits 65B to 66D have the same shape as the slit 65A. The legs 63B, 63C, 63D, 64B, 64C, and 64D with the slits 65A to 66D formed on both sides in the arrangement direction of the winding wire 244U have symmetrical shapes. On the other hand, the legs 63A, 63E, 64A, and 64E with the slits 65A, 65D, 66A, and 66D formed only on one side in the arrangement direction of the winding wire 244U have surfaces that extend linearly in the protruding direction on the side opposite to the slits 65A, 65D, 66A, and 66D.

In addition, the legs 63A and 64A, the legs 63B and 64B, the legs 63C and 64C, the legs 63D and 64D, and the legs 63E and 64E are arranged at positions overlapping each other when viewed from the extending direction of the winding wire 244U. As a result, slits 65A and 66A, the slits 65B and 66B, the slits 65C and 66C, and the slits 65D and 66D are formed at positions overlapping each other when viewed from the extending direction of the winding wire 244U. Then, the slits 65A and 66A accommodate one of the four winding wires 244U, the slits 65B and 66B accommodate another one of the four winding wires 244U, the slits 65C and 66C accommodate another one of the four winding wires 244U, and the slits 65D and 66D accommodate another one of the four winding wires 244U.

Figures 10A, 10B, 10C, 10D:
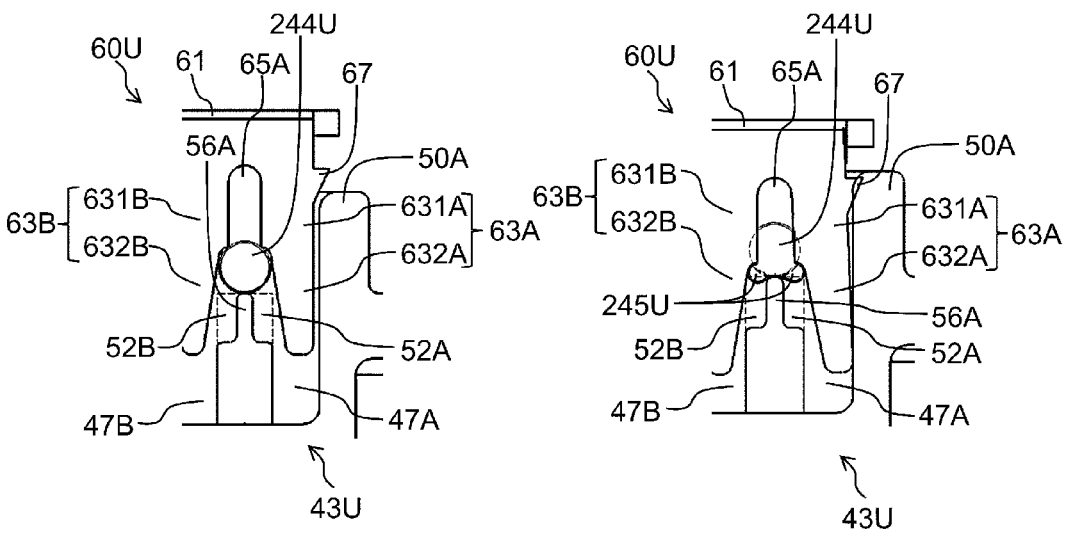
FIG. 10A to FIG. 10D are cross-sectional views showing a process of inserting the winding wire into the slit of the slit terminal.

As shown in FIG. 10A, the winding wire 244U is inserted into the slit 65A from the opened tip side of the legs 63A and 63B. Here, the width of the slit 65A at the position of the bases portion 631A and 631B is smaller than the diameter of the core wire of the winding wire 244U. Thus, as shown in FIG. 10B to FIG. 10D, the winding wire 244U is press-fitted between the base portions 631A and 631B in the process of entering the deep side of the slit 65A. Then, a pair of peeled pieces 245U are peeled off from the winding wire 244U press-fitted between the base portions 631A and 631B. The peeled pieces 245U include not only the insulating coating but also a part of the conductive core wire.

Thus, as shown in FIG. 6, the winding wire 244U press-fitted into the slit 65A exposes the core wire of the portion that comes into contact with the base portions 631A and 631B. The same applies to the slits 65B, 65C, 65D, 66A, 66B, 66C, and 66D. As a result, each of the four winding wires 244U is electrically connected to the circuit board 202 through the slit terminal 60U.

Furthermore, as shown in FIG. 7, pressing protrusions 67 and 68 that protruding in the arrangement direction of the winding wire 244U are formed on the surfaces of the legs 63A and 64A opposite to the slits 65A and 66A. The pressing protrusions 67 and 68 abut against restricting walls 50A and 51A, which will be described later, of the terminal holder 43U to prevent the slit terminal 60U from rattling with respect to the terminal holder 43U.

The terminal holder 43U has a function to fix the slit terminal 60U that accommodates the four winding wires 244U to the motor bracket 203. The terminal holder 43U also has a function to accommodate the pair of peeled pieces 245U peeled off from the winding wires 244U that are press-fitted into the slits 65A to 66D.

As shown in FIG. 8, the terminal holder 43U has winding wire accommodation spaces 44A, 44B, 44C, and 44D that respectively accommodate the four winding wires 244U. The winding wire accommodation spaces 44A to 44D are defined by five (=N+1) partition walls 45A, 45B, 45C, 45D, and 45E provided at positions that are spaced apart in the arrangement direction of the winding wire 244U. Both sides of the winding wire accommodation spaces 44A to 44D in the extending direction of the winding wire 244U and the surface of the slit terminal 60U facing the base 61 are opened. Further, holding protrusions 46B to 46E are respectively formed on the side surfaces of the partition walls 45B to 45E to prevent the accommodated winding wires 244U from coming off.

In addition, the terminal holder 43U has leg accommodation spaces 47A, 47B, 47C, 47D, 47E, 48A, 48B, 48C, 48D, and 48E to respectively accommodate the ten legs 63A to 64A. The leg accommodation spaces 47A to 48E are provided on both sides of the partition walls 45A to 45E in the extending direction of the winding wire 244U. As shown in FIG. 9B, the leg accommodation space 47A is defined by a pair of leg accommodation walls 49A and 49B that are arranged to face each other in the extending direction of the winding wire 244U. In the extending direction of the winding wire 244U, the interval D1 between the pair of leg accommodation walls 49A and 49B is set larger than the thickness dimension W of the leg 63A. The same applies to the leg accommodation spaces 47B to 48E.

The terminal holder 43U also includes a pair of restricting walls 50A and 50B and a pair of restricting walls 51A and 51B. The restricting walls 50A, 50B, 51A, and 51B are arranged adjacent to the leg accommodation spaces 47A, 47E, 48A, and 48E. Besides, the pair of restricting walls 50A and 50B and the pair of restricting walls 51A and 51B are arranged to face each other in the arrangement direction of the winding wire 244U. When the legs 63A, 63E, 64A, and 64E positioned on both sides in the arrangement direction of the winding wire 244U enter the leg accommodation spaces 47A, 47E, 48A, and 48E, the legs 63A, 63E, 64A, and 64E abut on the restricting walls 50A, 50B, 51A, and 51B. Thus, the pair of restricting walls 50A and 50B restrict elastic deformation of the legs 63A and 63E in the direction of separating from each other. Similarly, the pair of restricting walls 51A and 51B restrict elastic deformation of the legs 64A and 64E in the direction of separating from each other.

In addition, the terminal holder 43U has peeled piece accommodation spaces 52A, 52B, 52C, 52D, 52E, 52F, 52G, 52H, 53A, 53B, 53C, 53D, 53E, 53F, 53G, and 53H. The peeled piece accommodation spaces 52A and 52B and the peeled piece accommodation spaces 53A and 53B are arranged on both sides of the winding wire accommodation space 44A in the extending direction of the winding wire 244U. The peeled piece accommodation spaces 52A, 52B, 53A, and 53B accommodate the pair of peeled pieces 245U peeled off from the winding wire 244U that is press-fitted into the slits 65A and 66A.

Similarly, the peeled piece accommodation spaces 52C, 52D, 52E, 52F, 52G, 52H, 53C, 53D, 53E, 53F, 53G, and 53H respectively accommodate the pairs of peeled pieces 245U peeled off from the winding wires 244U press-fitted into the corresponding slits 65B, 65C, 65D, 66B, 66C, and 66D. Since the peeled piece accommodation spaces 52A to 53H have the same configuration, the peeled piece accommodation spaces 52A and 52B will be described below.

As shown in FIG. 9B, the peeled piece accommodation spaces 52A and 52B are defined by a pair of peeled piece accommodation walls 54A and 55A and a pair of peeled piece accommodation walls 54B and 55B that are arranged to face each other in the extending direction of the winding wire 244U. In the extending direction of the winding wire 244U, the thickness dimension W of the legs 63A and 63B is set larger than the interval D2 between the pair of peeled piece accommodation walls 54A and 55A and the pair of peeled piece accommodation walls 54B and 55B. Furthermore, the peeled piece accommodation spaces 52A and 52B communicate with the leg accommodation spaces 47A and 47B in the arrangement direction of the winding wire 244U. Then, as shown in FIG. 10D, parts of the legs 63A and 63B that have entered the leg accommodation spaces 47A and 47B are press-fitted into the peeled piece accommodation spaces 52A and 52B. That is, the pair of peeled piece accommodation walls 54A and 55A and the pair of peeled piece accommodation walls 54B and 55B are arranged to face each other across the legs 63A and 63B in the extending direction of the winding wire 244U.

The terminal holder 43U further includes peeling protrusions 56A, 56B, 56C, 56D, 57A, 57B, 57C, and 57D. The peeling protrusions 56A to 57D are respectively arranged between the peeled piece accommodation spaces 52A to 53H that are adjacent to each other in the arrangement direction of the winding wire 244U. As shown in FIG. 10B to FIG. 10D, the peeling protrusions 56A to 57D come into contact with the winding wires 244U press-fitted into the slits 65A to 66D, and peel the peeled pieces 245U from the winding wires 244U. Since the peeling protrusions 56A to 57D have the same configuration, the peeling protrusion 56A will be described below.

As shown in FIG. 9A, the peeling protrusion 56A is arranged between the pair of peeled piece accommodation spaces 52A and 52B in the arrangement direction of the winding wire 244U. In other words, the peeled piece accommodation spaces 52A and 52B are arranged on both sides of the peeling protrusion 56A in the arrangement direction of the winding wire 244U. Further, as shown in FIG. 9B, the peeling protrusion 56A is arranged between the peeled piece accommodation walls 54A and 54B and the peeled piece accommodation walls 55A and 55B in the extending direction of the winding wire 244U. Further, the leg accommodation spaces 47A and 47B are respectively formed on the side opposite to the peeling protrusion 56A across the peeled piece accommodation spaces 52A and 52B in the arrangement direction of the winding wire 244U.

The process of press-fitting the winding wire 244U into the slit 65A will be described with reference to FIG. 10A to FIG. 10D.

First, the terminal holder 43U is placed on a horizontal surface with the winding wire accommodation space 44A, the leg accommodation spaces 47A and 47B, the peeled piece accommodation spaces 52A and 52B, and the peeling protrusion 56A facing upward. Next, the winding wire 244U is placed in the winding wire accommodation space 44A. Thus, the tip of the peeling protrusion 56A comes into contact with the winding wire 244U, as shown in FIG. 10A.

Next, the slit terminal 60U is pressed into the terminal holder 43U with the guide portions 632A and 632B directed downward so that the winding wire 244U enters the slit 65A and the legs 63A and 63B enter the leg accommodation spaces 47A and 47B. Thus, the winding wire 244U pushed by the peeling protrusion 56A tries to widen the slit 65A (in other words, separate the legs 63A and 63B in the arrangement direction of the winding wire 244U) and enter between the base portions 631A and 631B. However, the legs 63A and 63E at both ends in the arrangement direction of the winding wire 244U abut against the pair of restricting walls 50A and 50B, which prevents the legs 63A and 63B from separating.

Accordingly, as shown in FIG. 10B to FIG. 10D, the winding wire 244U is press-fitted into the slit 65A while sliding on the legs 63A and 63B (more specifically, the base portions 631A and 631B). At this time, the legs 63A and 63B scrape off the winding wire 244U with the steps between the base portions 631A and 631B and the guide portions 632A and 632B and generate the pair of peeled pieces 245U. Then, the pair of peeled pieces 245U peeled off from the winding wire 244U are accommodated in the peeled piece accommodation spaces 52A and 52B.

In the extending direction of the winding wire 244U, the area of the winding wire 244U scraped off by the legs 63A and 63B is larger than the thickness dimension W of the legs 63A and 63B (that is, the interval D2 between the pair of peeled piece accommodation walls 54A and 55A). Therefore, the peeled pieces 245U are press-fitted into the peeled piece accommodation spaces 52A and 52B in a compressed state. Also, the parts of the legs 63A and 63B that enter the leg accommodation spaces 47A and 47B are press-fitted into the peeled piece accommodation spaces 52A and 52B to close most of the peeled piece accommodation spaces 52A and 52B. Furthermore, the pressing protrusion 67 abuts against the restricting wall 50A, thereby preventing the slit terminal 60U from rattling with respect to the terminal holder 43U.

(Configuration of the Fan 3)

As shown in FIG. 1 and FIG. 2, the fan 3 includes a boss portion 31 that rotates integrally with the rotor 23 about the axis of the shaft 21, a plurality of blades 32 (seven in this embodiment) that project radially from the outer periphery of the boss portion 31, and a plurality of connecting members 33 (seven in this embodiment) that connect the adjacent blades 32 on the tip side.

The boss portion 31 includes a disk-shaped disk portion 311, and a cylindrical peripheral wall portion 312 that protrudes from the outer edge of the disk portion 311 toward the motor 2 and has the blades 32 attached thereto. When the fan 3 is attached to the motor 2, the disk portion 311 faces the connecting wall 232C of the rotor yoke 232, and the peripheral wall portion 312 surrounds the outer peripheral wall 232A of the rotor yoke 232.

Then, as shown in FIG. 2, the fan 3 is fastened to the rotor yoke 232 with screws 10 that are screwed into screw holes 313. In this embodiment, considering the rotation balance of the fan 3, three screws 10 are attached to be evenly spaced on the circumference of the fan 3 centered on the rotation center. Nevertheless, it is not necessary to use three screws 10 as the fastening members for fastening the fan 3 to the motor 2. The number of screws 10 and the types of fastening members are not particularly limited as long as the fan 3 can be fastened to the motor 2.

The above embodiment achieves, for example, the following functions and effects.

According to the above embodiment, the pair of peeled pieces 245U peeled off from the winding wire 244U press-fitted into the slit 65A are accommodated in the peeled piece accommodation spaces 52A and 52B. Thus, it is possible to prevent the peeled pieces 245U from contacting the circuit board 202, thereby preventing the circuit board 202 from having a short circuit. The configuration reduces the probability of failure of the motor 2, which contributes to waste reduction.

Further, according to the above embodiment, the winding wire 244U is pushed by the peeling protrusion 56A and pressed into the slit 65A, which makes it possible to reliably press-fitting the winding wire 244U into the slit 65A. In this way, the yield in the manufacturing process of the motor 2 is improved, so waste can be further reduced. However, if the winding wire 244U has a small diameter, the peeling protrusion 56A may be omitted.

Further, according to the above embodiment, the thickness dimension W of the leg 63A is smaller than the interval D1 between the pair of leg accommodation walls 49A and 49B, which allows the leg 63A to smoothly enter the leg accommodation space 47A at the initial stage of the assembly process shown in FIG. 10A to FIG. 10D. On the other hand, by making the thickness dimension W of the leg 63A larger than the interval D2 between the pair of peeled piece accommodation walls 54A and 55A, the leg 63A can be inserted straight without being twisted at the later stage of the assembly process shown in FIG. 10A to FIG. 10D. Furthermore, by setting W>D2, a large peeled piece 245U is accommodated in the peeled piece accommodation space 52A in a compressed state, which prevents the peeled piece 245U from falling out of the peeled piece accommodation space 52A.

Further, according to the above embodiment, the legs 63A and 63E at both ends abut against the pair of restricting walls 50A and 50B, which prevents the legs 63A and 63B from separating in the process of press-fitting the winding wire 244U into the slit 65A. Thus, the peeled pieces 245U can be reliably peeled off from the winding wire 244U to bring the exposed core wire into contact with the slit terminal 60U. Furthermore, the pressing protrusion 67 abuts against the restricting wall 50A and prevents the slit terminal 60U from rattling with respect to the terminal holder 43U, thereby preventing poor contact between the winding wire 244U and the slit terminal 60U. As a result, the yield in the manufacturing process of the motor 2 is further improved.

To achieve the above-described functions and effects, the positional relationship between the terminal holders 43U, 43V, and 43W and the slit terminals 60U, 60V, and 60W, and the components of the brushless motor 201 (the shaft 21, the rotor 23, and the stator 24) and the motor bracket 203 is not limited to the example in FIG. 1 to FIG. 5.

In addition, although the above embodiment illustrates an example of supplying cooling air to a radiator as an application of the fan device 1, the application of the fan device 1 is not limited thereto. Although the above embodiment illustrates an example of a fan motor that rotationally drives the fan 3 as an application of the motor 2, the application of the motor 2 is not limited thereto. As another example, the motor 2 may be used for opening and closing a sliding door of an automobile.

Second Embodiment

A slit terminal 60U' according to the second embodiment will be described with reference to FIG. 11A to FIG. 13B. Detailed description of the common points between the first embodiment and the second embodiment will be omitted, and the description will focus on the differences. Besides, although the relationship between a pair of legs 63A' and 63B' is described below, the same applies to other adjacent legs. Furthermore, although not shown, the following description also applies to slit terminals 60V' and 60W'.

Figures 11A, 11B, 11C:
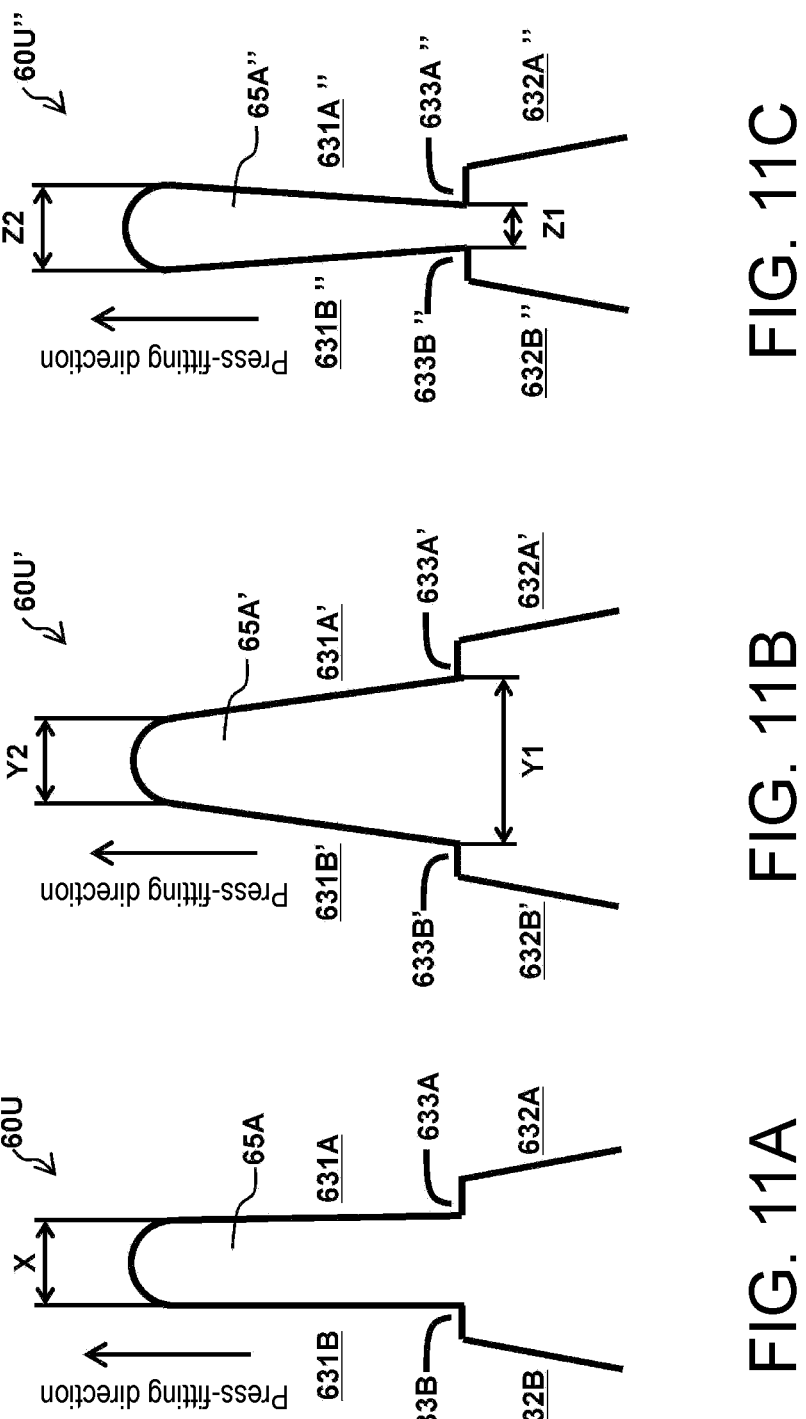
FIG. 11A is a view showing the dimensional relationship between a pair of legs according to the first embodiment.
FIG. 11B is a view showing the dimensional relationship between a pair of legs according to the second embodiment.
FIG. 11C is a view showing the dimensional relationship between a pair of legs according to a comparative example.

FIG. 11A is a view showing the dimensional relationship between a pair of legs 63A and 63B according to the first embodiment, FIG. 11B is a view showing the dimensional relationship between a pair of legs 63A' and 63B' according to the second embodiment, and FIG. 11C is a view showing the dimensional relationship between a pair of legs 63A" and 63B" according to a comparative example.

As shown in FIG. 11A, the legs 63A and 63B according to the first embodiment include edge portions 633A and 633B between the base portions 631A and 631B and the guide portions 632A and 632B. The edge portions 633A and 633B play a role in peeling off the pair of peeled pieces 245U from the winding wire 244U that is press-fitted between the pair of base portions 631A and 631B (that is, the slit 65A). Further, an interval X (for example, 0.75 mm) between the pair of legs 63A and 63B (more specifically, the pair of base portions 631A and 631B) is constant in the press-fitting direction of the winding wire 244U (that is, the pair of base portions 631A and 631B are parallel). In other words, the width of the slit 65A according to the first embodiment is constant in the press-fitting direction of the winding wire 244U.

In FIG. 11A, the peeled pieces 245U of the winding wire 244U are peeled off by the pair of edge portions 633A and 633B, and only the portion with the width X of the center portion is press-fitted into the slit 65A. That is to say, the winding wire 244U after the peeled pieces 245U are peeled off matches the width X of the slit 65A at the stroke end.

As shown in FIG. 11B, the legs 63A' and 63B' according to the second embodiment include edge portions 633A' and 633B' between the base portions 631A' and 631B' and the guide portions 632A' and 632B'. The edge portions 633A' and 633B' have the same role as in FIG. 11A. Further, the intervals Y1 and Y2 between the pair of legs 63A' and 63B' (more specifically, the pair of base portions 631A' and 631B') gradually narrow toward the press-fitting direction of the winding wire 244U. In other words, the slit 65A' according to the second embodiment has a tapered shape whose width gradually decreases toward the press-fitting direction of the winding wire 244U.

That is to say, the interval Y1 (for example, 0.8 mm) between the tips (positions of the edge portions 633A' and 633B') of the pair of base portions 631A' and 631B' is larger than the interval Y2 (0.7 mm) between the pair of base portions 631A' and 631B' on the base end side (stroke end) (Y1>Y2). If the dimensional tolerance of the slit terminal 60U is T (for example, 0.05 mm), the design is desired to be Y1−Y2≥2T, which ensures Y1≥Y2 even if there are manufacturing errors in the most unfavorable direction. The stroke end refers to a position where the winding wire 244U with the pair of peeled pieces 245U peeled off is finally placed.

In FIG. 11B, the peeled pieces 245U of the winding wire 244U are peeled off by the pair of edge portions 633A' and 633B', and only the portion with the width Y1 of the center portion is press-fitted into the slit 65A'. That is to say, the winding wire 244U after the peeled pieces 245U are peeled off is larger than the width Y2 of the slit 65A' at the stroke end. Thus, the winding wire 244U after the peeled pieces 245U are peeled off is compressed in the process of being press-fitted toward the stroke end. As a result, the winding wire 244U and the pair of legs 63A' and 63B' are electrically connected properly at the stroke end.

As shown in FIG. 11C, the intervals Z1 and Z2 between a pair of legs 63A" and 63B" (more specifically, a pair of base portions 631A" and 631B") according to a comparative example gradually widen toward the press-fitting direction of the winding wire 244U. In other words, the slit 65A" according to the comparative example has a reverse tapered shape whose width gradually increases toward the press-fitting direction of the winding wire 244U. That is, the interval Z1 between the tips (positions of the edge portions 633A" and 633B") of the pair of base portions 631A" and 631B" is smaller than the interval Z2 between the pair of base portions 631A" and 631B" on the base end side (stroke end) (Z1<Z2).

In FIG. 11C, the peeled pieces 245U of the winding wire 244U are peeled off by the pair of edge portions 633A" and 633B", and only the portion with the width Z1 of the center portion is press-fitted into the slit 65A". That is to say, the winding wire 244U after the peeled pieces 245U are peeled off is larger than the width Z2 of the slit 65A" at the stroke end. As a result, the electrical connection between the winding wire 244U and the pair of legs 63A" and 63B" becomes unstable at the stroke end.

Figure 12A:
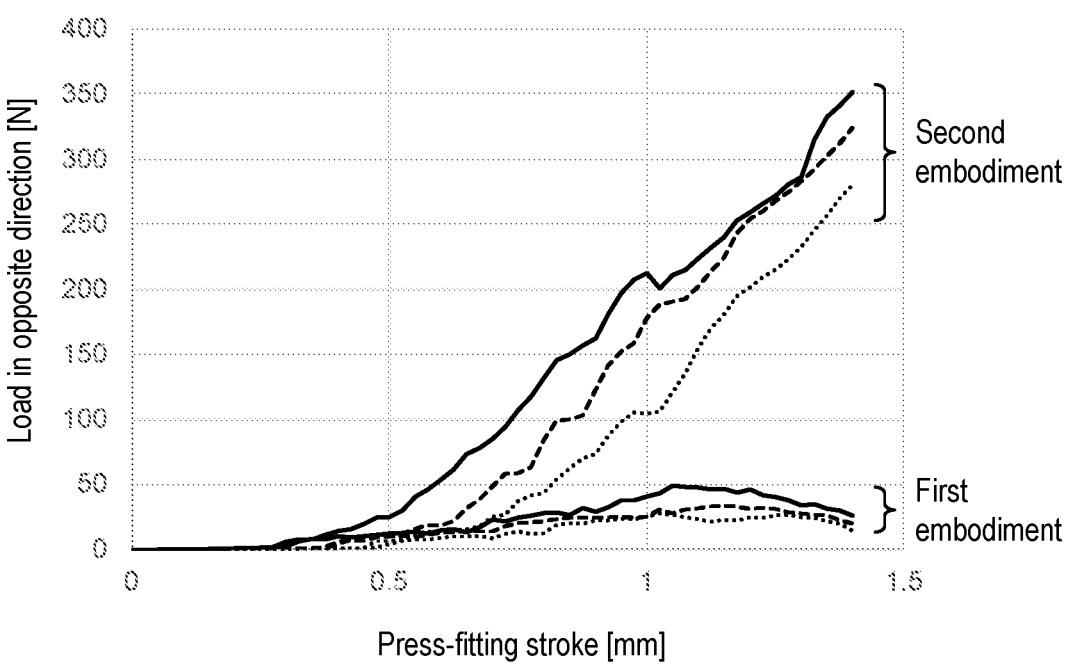
FIG. 12A and FIG. 12B are simulation results of the load in the opposite direction of the legs, applied to the winding wire from a pair of legs.
Figure 12B:
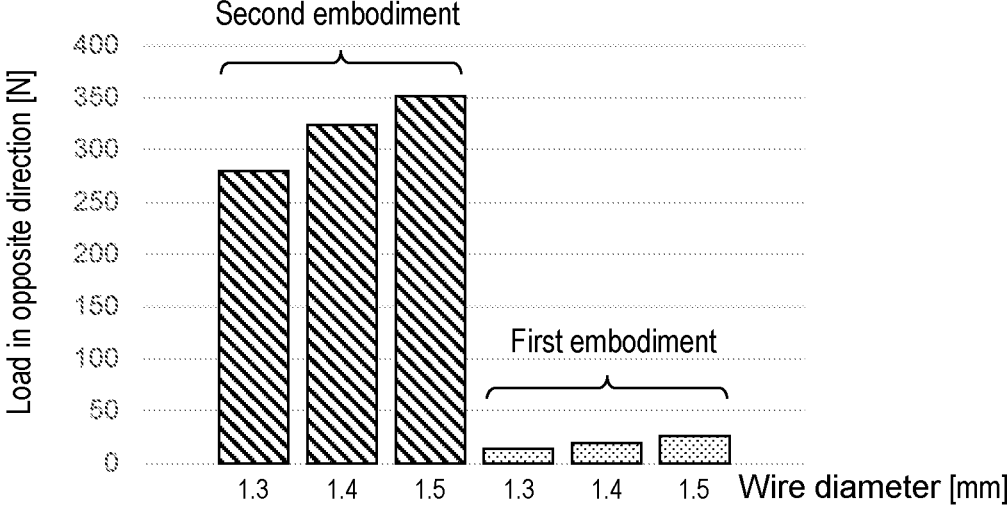
Figure 13A:
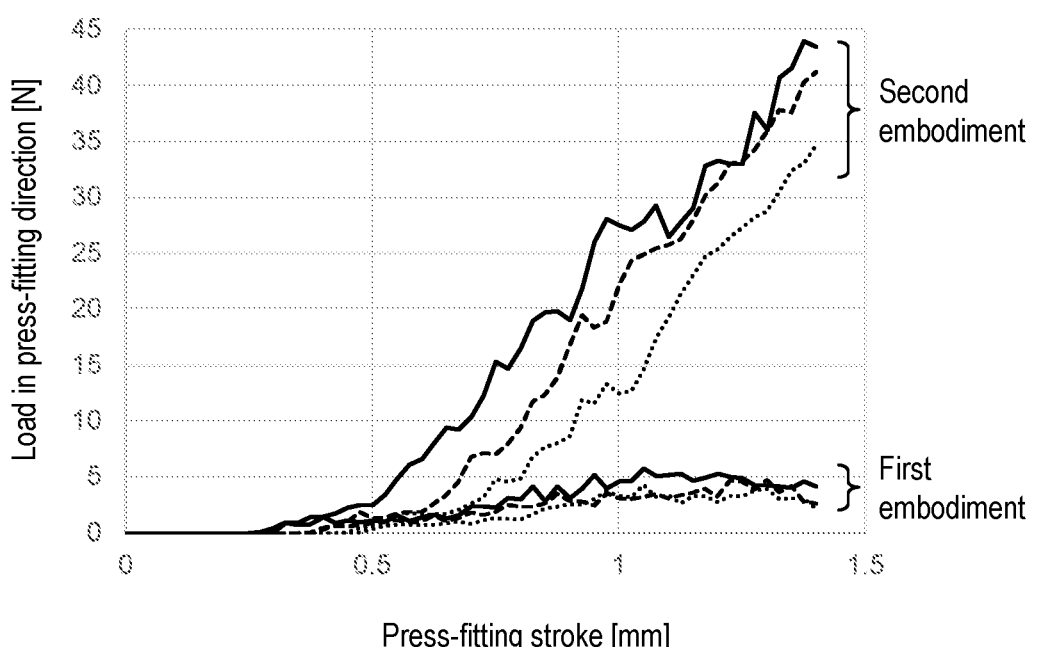
FIG. 13A and FIG. 13B are simulation results of the load in the press-fitting direction of the winding wire, applied to the winding wire from a pair of legs.
Figure 13B:
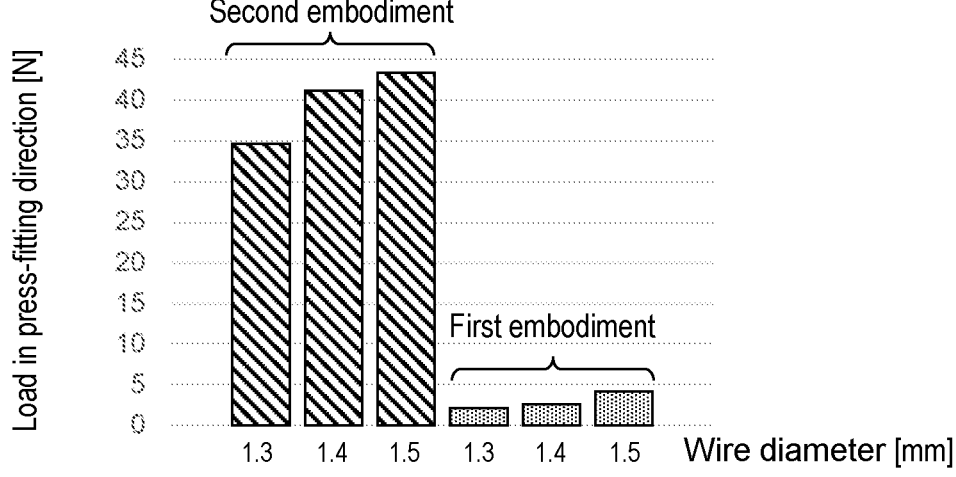

FIG. 12A and FIG. 12B are simulation results of the load in the opposite direction of the legs, applied to the winding wire from a pair of legs. FIG. 13A and FIG. 13B are simulation results of the load in the press-fitting direction of the winding wire, applied to the winding wire from a pair of legs. More specifically, FIG. 12A and FIG. 13A show the load at each position in the press-fitting process (hereinafter referred to as "press-fitting stroke"). Moreover, FIG. 12B and FIG. 13B show the load at the stroke end.

In FIG. 12A, FIG. 12B, FIG. 13A, and FIG. 13B, the simulation was carried out by changing the wire diameter of the winding wire 244U to 1.3 mm, 1.4 mm, and 1.5 mm. In addition, in FIG. 12A, FIG. 12B, FIG. 13A, and FIG. 13B, the simulation was carried out based on the first embodiment (that is, the shape of FIG. 11A) and the second embodiment (that is, the shape of FIG. 11B). Furthermore, it was assumed in this simulation that the interval between the pair of legs did not change even with the winding wire 244U press-fitted thereinto.

Referring to FIG. 12A and FIG. 13A, the load applied to the winding wire 244U from the legs 63A and 63B according to the first embodiment was approximately constant over the entire press-fitting stroke. In contrast, the load applied to the winding wire 244U from the legs 63A' and 63B' according to the second embodiment increased as the winding wire 244U approached the stroke end. That is, it can be seen that according to the second embodiment, the winding wire 244U was press-fitted into the slit 65A' while being compressed.

Further, referring to FIG. 12B and FIG. 13B, the load applied to the winding wire 244U from the legs 63A' and 63B' according to the second embodiment was much larger than the load applied to the winding wire 244U from the legs 63A and 63B according to the first embodiment. In particular, it can be seen that the load was larger in the second embodiment even when comparing the wire diameter of 1.3 mm in the second embodiment with the wire diameter of 1.5 mm in the first embodiment. That is, it can be seen that the electrical connection between the legs 63A' and 63B' and the winding wire 244U according to the second embodiment was better than in the first embodiment.

The embodiment of the disclosure has been described above. Nevertheless, the disclosure is not limited to the above-described embodiment and includes various modifications. For example, the above embodiment has been described in detail in order to make the disclosure easy to understand, and does not necessarily include all the configurations mentioned. It is possible to replace a part of the configuration of this embodiment with the configuration of another embodiment, and it is also possible to add the configuration of another embodiment to the configuration of this embodiment. Furthermore, it is possible to add, delete, or replace another configuration to, from, or with a part of the configuration of this embodiment.

What is claimed is:

1. A motor, comprising:
a motor bracket;
a shaft supported by the motor bracket;
a rotor rotatably supported by the shaft;
a stator fixed to the motor bracket and comprising a plurality of teeth arranged at positions spaced apart in a circumferential direction and a plurality of coils formed by winding a winding wire around each of the plurality of teeth, wherein the winding wire has a conductive core wire covered with an insulating coating;
a circuit board fixed to the motor bracket and controlling generation of a magnetic field for rotating the rotor by supplying currents to the coils; and
a slit terminal electrically connecting the winding wire to the circuit board,
wherein the slit terminal comprises a pair of legs arranged to face each other across the winding wire at an interval that is narrower than a diameter of the core wire, and
the motor bracket comprises a terminal holder having peeled piece accommodation spaces for accommodating peeled pieces peeled off from the winding wire press-fitted between the pair of legs.

2. The motor according to claim 1, wherein each of the peeled piece accommodation spaces is defined by a pair of peeled piece accommodation walls arranged to face each other across each leg of the pair of legs in an extending direction of the winding wire.

3. The motor according to claim 2, wherein the terminal holder comprises a peeling protrusion that is arranged between the pair of peeled piece accommodation walls and comes into contact with the winding wire press-fitted between the pair of legs to peel off the peeled pieces from the winding wire, and
the peeled piece accommodation spaces are formed on both sides of the peeling protrusion.

4. The motor according to claim 3, wherein the terminal holder has leg accommodation spaces that respectively accommodate the legs and communicate with the peeled piece accommodation spaces on sides opposite to the peeling protrusion across the peeled piece accommodation spaces,
each of the leg accommodation spaces is defined by a pair of leg accommodation walls arranged to face each other across the leg in the extending direction of the winding wire,
a part of the leg accommodated in the leg accommodation space enters the peeled piece accommodation space, and
a thickness dimension of the leg is larger than an interval between the pair of peeled piece accommodation walls and smaller than an interval between the pair of leg accommodation walls in the extending direction of the winding wire.

5. The motor according to claim 3, wherein the slit terminal comprises (N+1) legs arranged to face each other respectively across N winding wires that are arranged in parallel, and
the terminal holder comprises a pair of restricting walls that respectively abut against the legs at both ends to restrict elastic deformation of the legs at both ends in a direction of separating from each other.

6. The motor according to claim 1, wherein the peeled piece accommodation spaces are formed at a plurality of positions spaced apart in an extending direction of the winding wire.

7. The motor according to claim 1, wherein an interval between the pair of legs gradually narrows toward a press-fitting direction of the winding wire.

8. A fan device, comprising:
the motor according to claim 1; and
a fan rotationally driven by the motor to generate cooling air.

* * * * *